Feb. 13, 1940. E. NORRMAN Re. 21,355

APPARATUS FOR TIMING WATCHES

Original Filed Feb. 14, 1936 2 Sheets-Sheet 1

INVENTOR

ERNST NORRMAN

Hammond & Littell

ATTORNEYS

Feb. 13, 1940. E. NORRMAN Re. 21,355
APPARATUS FOR TIMING WATCHES
Original Filed Feb. 14, 1936 2 Sheets-Sheet 2
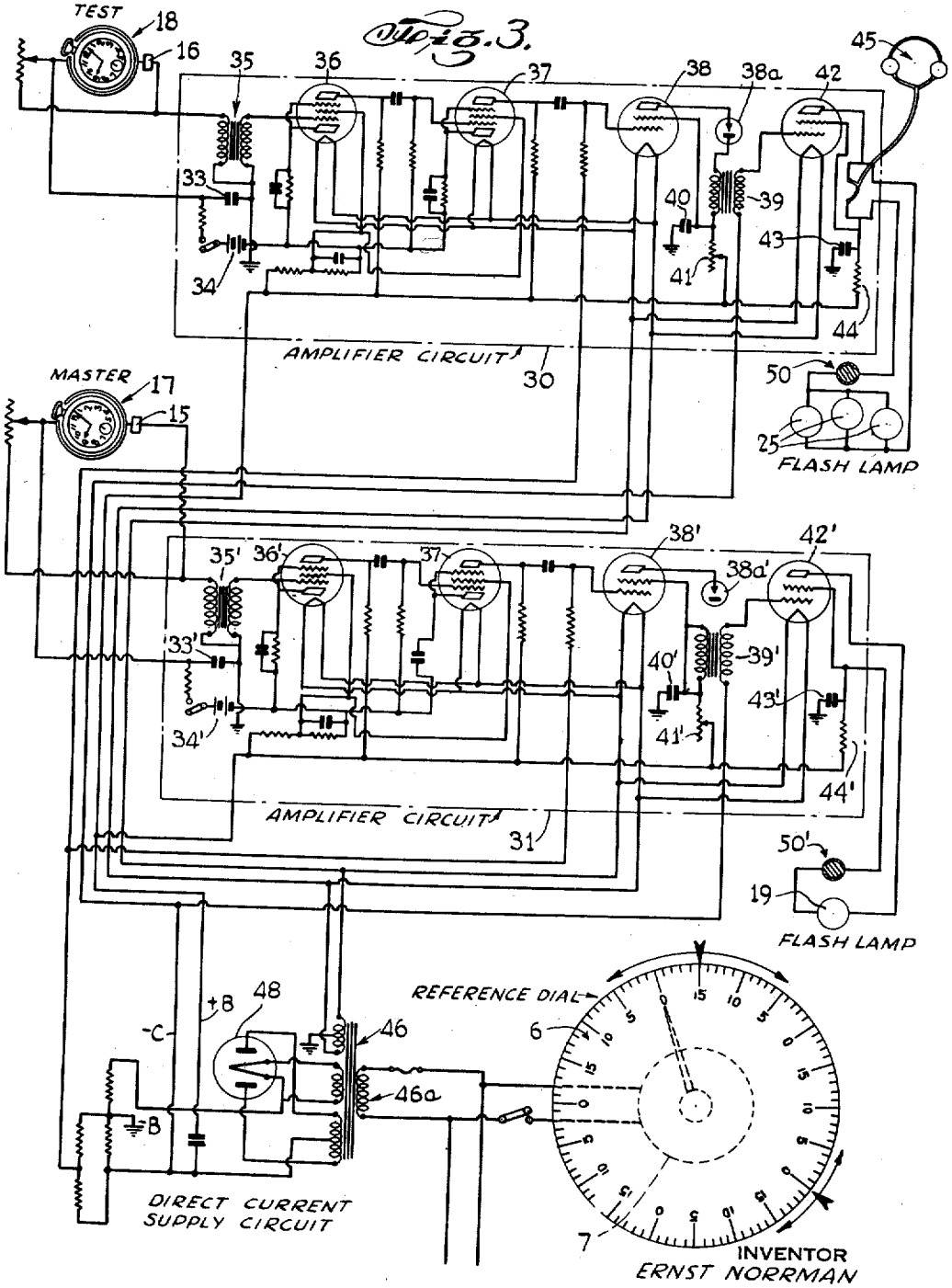
INVENTOR
ERNST NORRMAN
BY Hammond & Littell
ATTORNEYS Reissued Feb. 13, 1940 Re. 21,355

UNITED STATES PATENT OFFICE 21,355

APPARATUS FOR TIMING WATCHES

Ernst Norrman, Chicago, Ill.

Original No. 2,064,559, dated December 15, 1936, Serial No. 63,858, February 14, 1936. Application for reissue July 30, 1937, Serial No. 156,548

19 Claims. (Cl. 73—51)

The present invention has for an object to provide an improved apparatus for testing chronometers as compared with a master chronometer.

In the course of the manufacture of chronometers of all kinds various adjustments are necessary if accuracy under the varying conditions is to be secured. This is particularly true of watches which, if the maximum accuracy is to be maintained must be adjusted for changes in temperature and for the changes in the position in which they may be carried. For example, a watch can be so adjusted that it will vary less than five seconds per day when held in any one of five positions. When it is noted that the adjustment to such accuracy requires repeated testing of the running and repeated stoning of the bearings until by the cut and try method the required accuracy is obtained, it is obvious that without precision instrumentalities a long time may elapse after a watch is assembled before it is ready for delivery. In a watch repair shop such time requirement delays return of the watch to the customer. In a factory such a time interval means a tie up of capital and unavoidable delay in filling orders, particularly special orders.

If, for example, it is possible to read the time of the watch to an accuracy of only one second then a considerable period is necessary to detect a variation which should be corrected, but if the watch can be read to an accuracy of 1/100 of a second a correspondingly shorter period of time is sufficient to determine a similar variation.

The present invention in its preferred embodiment provides an apparatus for timing watches as compared with a rotating dial, one graduation of which represents a variation of 1/100 of a second, and inasmuch as it is possible ordinarily to read to a fraction of the graduation it is possible to detect even smaller variations.

The invention provides furthermore an improved arrangement for timing watches whereby a master watch may be used as the source for the correct standard rate and the rotating dial or its equivalent may be driven at a rate which only approximates the correct rate such, for example, as may be obtained from a motor operated by the usually available alternating current or even by direct current using a suitable motor with an adjustable speed control.

The present invention has been developed more particularly in producing an apparatus for testing watches for adjustment or regulation and for the purposes of disclosure of the principles of the invention such an apparatus will be described, reference being had to the accompanying drawings forming a part hereof and in which:

Fig. 3 is a circuit diagram indicating connections whereby an alternating current source may be utilized and showing one of the amplifier circuits in detail.

Figure 1:
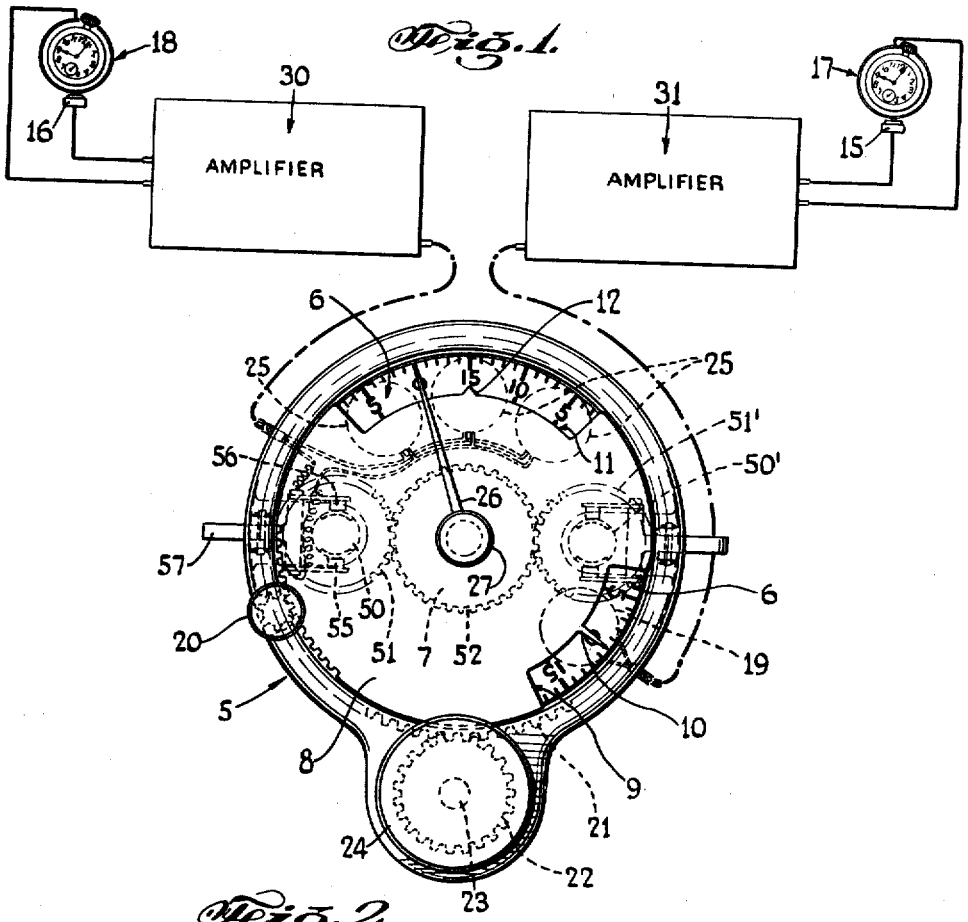
Figure 1 is a diagrammatic view of an illustrative arrangement showing the face of the instrument and showing diagrammatically the microphone and amplifier arrangement.

The apparatus to be described for the purposes of illustration comprises an instrument 5 having a rotatable graduated dial 6 which may be mounted on the shaft of a motor 7 within the instrument casing. The motor is preferably a synchronous motor driven at a constant speed from a suitable alternating current source. The top of the casing is formed to provide an adjustable disk 8 formed with a window 9 and at the center thereof an index 10 for framing the reference dial with respect to the ticks of the master watch. A somewhat similar window 11 is provided having, if desired, a central index 12 for studying the action of the watch to be tested.

Two tick responsive devices such as microphones 15, 16 are provided having suitable supports to receive the master watch 17 and the watch to be tested 18.

The rotatable dial 6 may be made of translucent material with black graduation marks and numerals whereby it can be illuminated from beneath for the purposes of reading. This arrangement is in some respects more practical than an arrangement in which the disk is opaque and illuminated on its face. The dial as shown has one hundred graduations divided into five groups with similar markings to correspond to the five ticks of a watch. For watches with a different number of ticks a correspondingly different dial may be substituted.

As the microphone 15 responds to the ticks of the master watch 17, the impulse is amplified and shortened to provide a momentary current for illuminating the neon flash lamp 19 beneath the transparent dial 6 at the window 9.

Provision is made for relative adjustment between the rotating dial and the index 10 whereby the zero of the dial may be brought into registration with the index 10. As shown, the adjustable disk 8 in which the windows are formed is rotatably adjustable in the casing, a handle 20 being provided to facilitate adjustment. If only a minor adjustment of the disk is necessary to correctly frame the dial this is more conveniently done by a slight movement of the disk 8. If a greater adjustment is necessary, or in any event if desired, the adjustment for framing may be made by rotating the motor as a whole within the casing. For this purpose the motor is shown as mounted on a base 21 having gear teeth on its periphery which are engaged by a pinion 22 on a vertical shaft 23 to the top of which is secured a suitable thumb wheel 24.

As the microphone 16 responds to the ticks of the watch to be tested, 18, the impulse is amplified and shortened to provide a momentary current for illuminating the neon lamp or lamps 25 beneath the dial 6 at the window 11. Three lamps are shown as giving a wider field of illumination than one lamp. Otherwise the operation is the same. An adjustable hand 26 which may be operated by a thumb nut 27 is provided at the window 11 and can be adjusted to show the position of a zero of the dial when the dial is suitably framed to bring a position of the dial opposite the index 10 during flashes from the watch ticks of the master watch.

It will be seen that the arrangement described makes provision for framing the dial relative to the index 10 and then adjusting the hand 26 to the zero as illuminated from the watch to be tested. Furthermore, re-framing is possible in the event of a shift of the dial relative to the index of the master watch during which re-framing the relation between the index 10 and the hand 26 is maintained. In other words, the hand 26, which also is an index, in its adjusted position moves with the index 10.

In order to ascertain the gain or loss of the watch being tested the dial is framed with reference to the master watch index 10 and the hand 26 is set to zero by the flash of the lamps 25. After a predetermined lapse of time the dial is again framed and the dial read by the flash of the lamps 25 at the hand 26 thus giving the number of hundredths of a second gain or loss during the elapsed time.

The positions of the windows 9 and 11 may be selected with relation to the number of zero positions on the dial and the angular position between them, but this is not necessary for reasons which will be seen upon analysis of the operation of the device.

For the purposes of illustration the watch supports may be carried by ball and socket joints on fixed bases, the ball and socket connection permitting movement of the support to any of the desired positions in which the running of the watch is to be tested. Ordinarily the master chronometer or watch support need not be adjustable for obvious reasons.

The watch holder is preferably carried by a sponge rubber or other suitable packing or damping element in order to avoid the effect of extraneous noises and jars which might otherwise excite the microphone button. This microphone is sensitive to the ticks of the watch but insensitive to room noises or jars. Across each microphone circuit a rheostat for adjusting its sensitivity may be connected.

The electrical circuit of each of the amplifiers indicated at 30 and 31 in Fig. 1 and shown in detail in the electrical diagram, Fig. 3, is substantially the same as the circuit shown in my co-pending application, Ser. No. 670,267, filed May 10th, 1933, now Letters Patent No. 2,058,616 dated Oct. 27, 1936, and includes both amplifying and impulse shortening circuits. In each amplifier circuit a condenser 33 (33') is charged slowly through a resistance from a battery 34 (34') between ticks of the watch so that upon the occurrence of a tick a relatively strong electrical impulse is supplied by the condenser which serves as a principal source of voltage at the instant of the impulse. The two amplifiers are similar. The reference numbers applied to the elements of amplifier 31 in the drawings are similar to those applied to similar elements of amplifier 30, except that those applied to amplifier 31 are primed.

The first two stages of amplification including the input transformer 35 and amplifier tubes 36 and 37 may be arranged in accordance with standard practice for a resistance coupled amplifier. The third vacuum tube 38 employs a special circuit which may be called the time limiting circuit. The control grid of this tube preferably is biased to such a high negative potential that no plate current or at least a very weak one, is flowing through the tube as long as the grid is not disturbed by impulses from the previous stage. A small condenser 40, which serves as a source of voltage is slowly charged through a very high value resistor 41. A glow discharge tube 38a or a spark gap may be included in the plate circuit as shown. This tube is usually not necessary but is of value if it is desirable to eliminate response to alternate ticks of the watch from the output and the arrangement making this possible will be described hereinafter. The first amplifier tube may also be biased approximately to "cut off" if desired.

The operation of the time limiting circuit is as follows: When the condenser 40 has been charged the circuit is at equilibrium, no current flowing in any part. When an impulse in a positive direction is impressed on the control grid of the tube 38, this tube will pass current and the condenser 40 discharges through the primary of the transformer 39. The time it takes for the condenser to discharge depends on its capacity and on the impedance of the primary winding of the transformer 39 and also on the plate impedance of the tube. By choosing the proper constants, impulses of very short duration may be obtained. After the condenser 40 is discharged practically no current will flow through the tube on account of the high value of the resistor 41, through which the condenser 40 is charged relatively slowly.

By this circuit arrangement impulses (A. C. or D. C.) of a relatively long duration will give output impulses of very short duration of the order of $1/1000$ or $1/10000$ of a second. The condenser 40 is slowly charged through the resistor 41, during the silent interval between the impulses and so the cycle repeats itself. The auxiliary grid of the vacuum tube 38 is connected to the plate side of the resistor 41. Thus this member has no voltage applied to it unless the condenser 40 is charged. This improves the time limiting action of the circuit.

The control grid of the output tube 42 is biased to or near "cut off" in order that it should not pass any current except when the grid is excited from the previous amplifier stage. A blocking resistor 44 and a storage condenser 43 are connected as shown to supply operating voltage to the lamps 25 in this circuit. The lamps 25 herein shown are neon lamps suitably designed to provide the desired instantaneous flash to illuminate the dial.

If desired earphones 45 may be added to the circuit for the watch to be tested to make audible the tick induced impulse.

It is seldom that the time interval between two successive ticks is exactly the same, perhaps because the escapement is not perfectly centred. For this reason if the flash lamps 25 are lighted in response to each tick of the watch the device will show an apparent hunting of the range of which will indicate the extent to which the escapement is inaccurately centred and whether correction is necessary. For timing purposes it is preferable to avoid this hunting and this may be accomplished by a provision whereby the lamps 25 are energized by alternate ticks only. This can be accomplished by varying the time of recharging of one of the condensers, for example, condenser 40. For this purpose, the several constants of the circuit are suitably chosen and the resistor 41 is made sufficient to prevent charging of condenser 40 between two successive grid impulses caused by the watch ticks while permitting an adequate charge during two intervals. Furthermore, this resistor is made adjustable in order that operation in either way may be possible, that is to say, operation to determine the difference between the two tick intervals and operation for timing the running of the watch. By further adjustment the time of charge may be even further extended to provide longer intervals between responses if desired. The bias resistance of the first amplifier tube 38 should be high to cause the tube to act as a rectifier. The neon lamp or spark gap serves to prevent a discharge of the condenser 40 before it reaches the break-down voltage of this tube or gap.

The power for the amplifying circuit may conveniently be supplied from an A. C. current which also operates the motor of the reference dial. In the arrangement illustrated the A. C. line current passes through the primary 46*a* of a transformer 46 which transformer through a secondary winding supplied current to the filaments of the tubes. A rectifier tube 48 provides direct current to the +B circuit. The arrangements giving the +B, −B and −C voltages are conventional and are sufficiently illustrated in the drawings.

Figure 2:
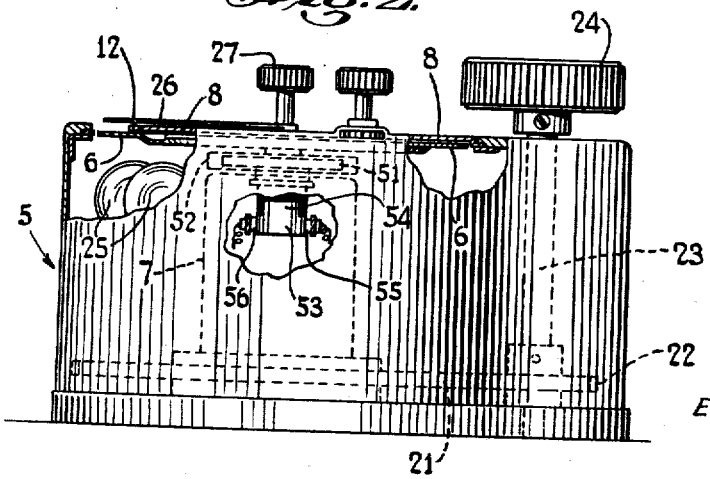
Fig. 2 is a view in elevation of the same.
Figure 4:
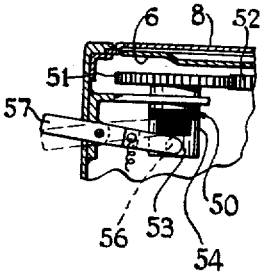
Fig. 4 is a sectional view of one of the switches.

A more positive method of insuring response to only alternate ticks of the watch thereby to prevent the appearance of hunting may be provided in accordance with the arrangement shown in Figs. 2 and 4. As there shown a commutator 50 which is connected to the motor shaft by gearing 51 and 52 to rotate once during an even number of ticks of the watch. In the arrangement indicated, assuming a dial 6 divided into five similar sections for a five tick watch the gearing ratio may be 4 to 5. This commutator is provided with an annular conducting section 53 and another section 54 which is divided into an even number of conducting and non-conducting sections to correspond to the number of ticks during one rotation, four being shown in the arrangement shown. A pair of brushes 55, 56 connected in one of the leads from the amplifier 30 to the lamps 25 is arranged to bear on the commutator. These brushes may be moved laterally by switch handle 57 to bear on the continuous conducting portion 53 when it is desired to obtain responses from all ticks of the watch for the purposes of observing the operation and relation of the ticks at both ends of the swing of the balance wheel. When the watch is examined for timing and response from alternate ticks is desired, the brushes are moved laterally so that at least one brush bears on the segmented portion of the armature. Ordinarily a device for eliminating response to alternate ticks of the master watch is less important but such is indicated at 50′, 51′ in Fig. 1.

*Operation*

In operation the watch or watches to be tested are placed against the microphone or microphones 16 and compared with the master chronometer. After a definite interval, as for example, two minutes, each watch is again compared to determine whether it is gaining or losing and how much. This procedure is repeated with the watches held in each position for which tests are desired. The method of comparison involves first framing the dial with respect to the master watch and if a number of watches are being tested reading the dial at the index 12 and making a record, which after the selected interval is compared with another record similarly made. If only one watch is being tested, then the dial is framed with respect to the master watch by the index 10 and the index hand 26 is adjusted to the zero position in the window 11. After the time interval the dial is again framed, if necessary, at the index 10 and reading is taken in the window 11. It is to be noted that the hand 26 is in fixed position with reference to the index 10 so that its proper position is not disturbed by the reframing of the dial. The expression "framing the dial" is used to indicate the operation of bringing together the zero reading and the index 10. The dial should be shaded from any bright light for easy readings. For accuracy the dial should be again framed when taking the second set of readings after a time interval. Furthermore if the impulses from alternate ticks are eliminated in effect, accuracy will be better insured if repeated readings are taken to be sure to use either the responses from what may be termed the fast ticks or those from the slow ticks in each case. It will be remembered that the time intervals between ticks is not uniform and if the dial is first framed for the fast tick and for second reading is framed for the slow tick or if a tested watch is similarly timed an error amounting to the difference of the tick intervals will be introduced. For obvious reasons it is usually more certain and simpler to frame the dial with reference to the master watch, while the circuit is responsive to both the fast and slow ticks of the master watch, using, for example, the fast tick which can be distinguished. Obviously this is of minor importance until close adjustment of the watch is approached.

The electrical responses may be explained as follows: When the voltage of the control grid of the tube 38 swings in a positive direction the plate impedance of the tube decreases and the neon tube, 38*a*, "breaks down" and passes current. The condenser 40 discharges through the primary of the transformer 39. The impulse is passed by the secondary winding of the transformer 39 to the control grid of the output tube 42. This tube will pass plate current and so flash the neon lamps 25. On account of the high resistance of resistor 41 the condenser 40 will not be charged sufficiently to "break through" the neon lamp 38a or spark gap the first time thereafter that the grid of the tube 38 swings positive and no output impulse will be obtained. This cycle will repeat itself.

The foregoing particular description is illustrative merely and is not intended as defining the limits of the invention. Numerous variations may be made, for example if the reference member is driven with sufficient accuracy the master watch becomes unnecessary.

I claim:

1. An apparatus for timing watches comprising, in combination, a motor and a reference dial constantly driven thereby, an index member adjacent said dial, a second index member adjacent said dial spaced from the first mentioned index member, means for mounting the motor and index members for relative adjustment to frame the dial, a flash lamp for illuminating the reference dial adjacent the first mentioned index member, a second flash lamp for illuminating the reference dial adjacent the second index member, tick responsive devices adapted to receive respectively the master watch and the watch to be tested, circuits for energizing the flash lamps respectively, each including a condenser of a capacity sufficient to energize its flash lamp for a period of the order of 1/1000 of a second when discharged therethrough and circuits connected one to each tick responsive device and arranged to trigger the respective flash lamp energizing circuits in response to the ticks of a master watch and the watch to be tested respectively.

2. Apparatus for timing watches, as defined in claim 1, wherein the motor and the dial are rotatably mounted for movement relative to the index members to frame the dial with respect to one index member.

3. Apparatus for timing watches, as defined in claim 1, wherein the second index member is adjustable relative to the first index member and wherein the framing means adjusts the relation between the dial and both index members equally.

4. Apparatus for timing watches, as defined in claim 1, wherein the index members are movable together circumferentially of the dial to frame the dial with respect to the first mentioned index member and one index member is independently movable circumferentially of the dial relative to the other index member.

5. An apparatus for timing watches comprising a constantly driven graduated dial, two index members adjacent said dial and spaced from each other, flash lamps positioned to illuminate said graduated dial adjacent the index members respectively, means for energizing said flash lamps respectively from a master watch and from a watch to be tested comprising tick responsive devices, an amplifier connected to each tick responsive device, and a flash lamp energizing circuit connected to each amplifier to be energized by a tick impulse to trigger the current through the flash lamp.

6. An apparatus for timing watches comprising a constantly driven graduated dial, two index members adjacent said dial and spaced from each other, flash lamps positioned to illuminate said graduated dial adjacent the index members respectively, means for energizing said flash lamps respectively from a master watch and from a watch to be tested comprising tick responsive devices, an amplifier connected to each tick responsive device and, connected to each amplifier, a flash lamp energizing circuit comprising a condenser, a resistance through which the condenser is slowly charged and a tube the grid of which is connected to the amplifier to be energized by the tick impulse to trigger the discharge through the flash lamp.

7. An apparatus for timing watches comprising a constantly driven graduated dial having repeating sections similarly graduated and of a length to be similarly illuminated at the time of successive ticks of a watch, two index members adjacent said dial, two flash lamps positioned to illuminate said graduated dial adjacent said index members, means for energizing said flash lamps respectively from a master watch and from a watch to be tested comprising tick responsive devices to receive respectively the master watch and the watch to be tested, two amplifiers connected respectively to said tick responsive devices, and flash lamp energizing circuits each comprising a condenser, a resistance through which the condenser is slowly charged and a tube the grid of which is connected to the respective amplifier to be energized by the tick impulses to trigger the discharge through the flash lamp.

8. An apparatus for timing watches as defined in claim 1, characterized in that the circuit for energizing one flash lamp includes means for eliminating the effect of alternate ticks of the watch.

9. An apparatus for timing watches as defined in claim 5, characterized in that the circuit for energizing one flash lamp includes means for eliminating the effect of alternate ticks of the watch.

10. An apparatus for timing watches as defined in claim 7, characterized in that the circuit for energizing one flash lamp includes means for eliminating the effect of alternate ticks of the watch.

11. An apparatus for timing watches comprising, in combination, a motor and a reference dial constantly driven thereby, an index number adjacent said dial, means for mounting the motor and index member for relative adjustment to frame the dial, a flash lamp for illuminating the reference dial adjacent the index member, tick responsive devices adapted to receive respectively a master watch and a watch to be tested, a circuit for energizing the flash lamp including a condenser of a capacity sufficient to energize its flash lamp for a period of the order of 1/1000 of a second when discharged therethrough and a circuit connected to the tick responsive device for the watch to be tested and arranged to trigger the flash lamp energizing circuit in response to the ticks of the watch to be tested, means cooperating with the tick responsive device for the master watch for indicating lack of synchronism between the rotating dial and the ticks of the master watch and means for relatively adjusting the motor and index member to frame the dial.

12. An apparatus for timing watches comprising, in combination, a motor, a reference dial constantly driven thereby, an index member adjacent said dial, means for mounting the dial and index member for relative adjustment to frame the dial, a flash lamp for illuminating the reference dial adjacent the index member, tick responsive devices adapted to receive respectively a master watch and a watch to be tested, means cooperating with one tick responsive device to energize said flash lamp to indicate lack of synchronism between the rotating dial and the ticks of the said watch, means to reframe the dial with respect to the index member, and means cooperating with the other tick responsive device to indicate the extent of lack of synchronism between the dial and the ticks of the other watch.

13. An apparatus for timing watches comprising, in combination, two tick responsive devices adapted to receive two watches, a reference member, means to drive the reference member at a substantially constant speed, an index member adjacent the reference member, means cooperating with one tick responsive device and the reference member to detect lack of synchronism between one watch and the reference member, means for reframing the reference member relative to the index member to compensate for the lack of synchronism, and means cooperating with the second tick responsive device and the reference member for indicating the extent of the lack of synchronism between the second watch and the reference member.

14. An apparatus for timing watches comprising, in combination, two tick responsive devices adapted to receive two watches, a reference member, means to drive the reference member at a substantially constant speed, an index member adjacent the reference member, means cooperating with one tick responsive device and the reference member to detect lag of the reference member with respect to one watch, means for giving additional movement to the reference member for relatively adjusting the same and means cooperating with the second tick responsive device and the reference member for indicating the extent of the lack of synchronism between the second watch and the reference member.

15. An apparatus for timing watches comprising, in combination, a tick responsive device adapted to receive a master watch, an impulse circuit controlled thereby, a reference member, means to drive the reference member at a substantially constant speed, an index member adjacent the reference member, means for reframing the reference member relative to the index member to adjust the reference member with respect to the ticks of the master watch, a second tick responsive device adapted to receive a watch under test, and means cooperating with the second tick responsive device and the reference member to indicate the lack of synchronism between the watch under test and the reference member.

16. An apparatus for timing watches comprising, in combination, a motor, a reference dial constantly driven thereby, a tick responsive device adapted to receive a master watch, an amplifier impulse circuit controlled by said tick responsive device, means to additionally rotate the dial to adjust the dial with respect to the impulses of the amplifier circuit, a second tick responsive device adapted to receive a watch under test, and means controlled by said second tick responsive device for showing the lag or lead of the ticks of the watch under test relative to the rotation of the dial.

17. An apparatus for timing watches comprising, in combination, a motor, a reference dial constantly driven thereby, a tick responsive device adapted to receive a master watch, an amplifier impulse circuit controlled by said tick responsive device, means to additionally rotate the dial to reset the dial with the impulses of the amplifier circuit, a second tick responsive device adapted to receive a watch under test, a flash lamp adjacent the dial, and an amplifier impulse circuit controlled by said second tick responsive device to energize the flash lamp.

18. An apparatus for timing watches comprising a rotating member, two index members adjacent said rotating member and spaced from each other, flash lamps positioned to illuminate said rotating member adjacent the index members respectively, means for energizing certain of said flash lamps from a master watch and for energizing certain of said flash lamps from a watch to be tested comprising tick responsive devices, an amplifier connected to each tick responsive device and a flash lamp energizing circuit connected to each amplifier to be energized by a tick impulse to trigger the current through the flash lamp.

19. An apparatus for timing five beat watches comprising, in combination, a constantly driven graduated dial having five repeating sections, means to drive the dial at a rate of one rotation per second, an index member adjacent the dial, a tick responsive device adapted to receive a master watch, a signal controlled by said tick responsive device, means for reframing the dial with respect to the index member to correspond to said signal, a second tick responsive device adapted to receive a watch to be tested, and a flash lamp adjacent the dial and arranged to be energized under control from said second tick responsive device.

ERNST NORRMAN.